Jan. 22, 1963 TOMOHARU OKUDA ET AL 3,074,855
PROCESS FOR PREPARING NARAMYCIN A AND ITS ISOMER
Filed June 13, 1961
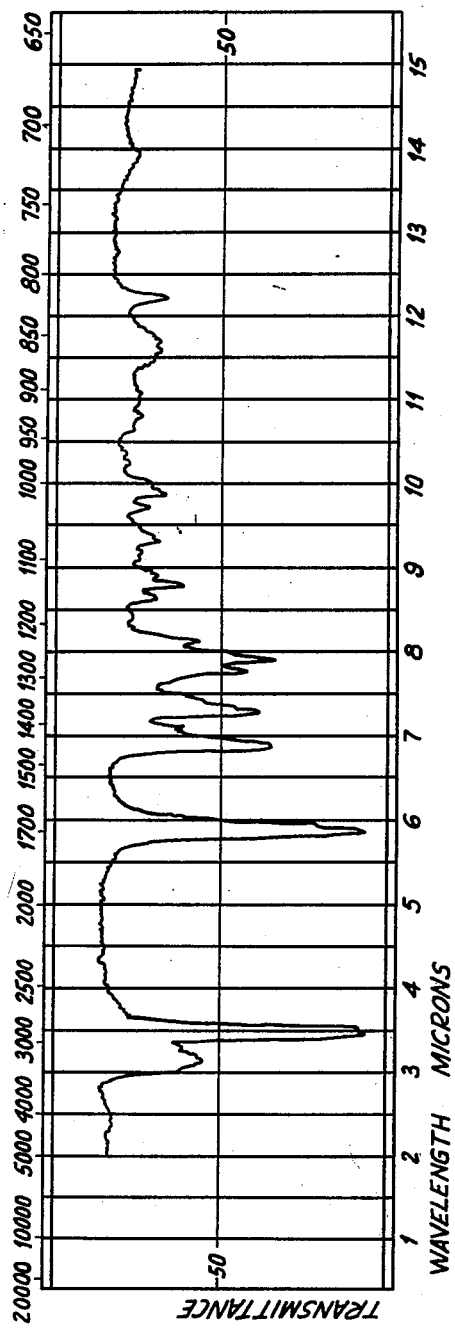
INVENTORS
TOMOHARU OKUDA
MAKOTO SUZUKI
YOSHIYUKI EGAWA
KOKICHI ASHINO
BY
ATTORNEYS

United States Patent Office 3,074,855
Patented Jan. 22, 1963

3,074,855
PROCESS FOR PREPARING NARAMYCIN A
AND ITS ISOMER
Tomoharu Okuda, Tokyo, Yoshiyuki Egawa, Kohoku-ku, Yokohama, Makota Suzuki, Tokyo, and Kokichi Ashino, Oaza Shimotoda, Toda-cho, Kita-Adachi-gun, Saitama-ken, Japan, assignors to Tanabe Seiyaku Co., Ltd., Tokyo, Japan, a corporation of Japan
Filed June 13, 1961, Ser. No. 120,126
Claims priority, application Japan Apr. 10, 1958
12 Claims. (Cl. 195—80)

This invention relates to a new and useful process for preparing bio-synthetic antimicrobial substances, and is more particularly concerned with a process for preparing antibiotics cycloheximide and its isomer having a high activity toward yeasts and certain plant pathogenic fungi, from a new strain of Streptomycetes.

This application is a continuation-in-part of our copending application Serial No. 801,454, filed April 1, 1959, and now abandoned.

It is known that there can be obtained antibiotic cycloheximide as a by-product of Streptomycin from a Streptomyces griseus fermented medium (F. E. Leach, J. Leach, J. H. Ford, A. F. Whiffen: J. Am. Chem. Soc., 69, 474 (1947)). In addition to Str. griseus, Str. noursei and Str. No. ETH 7796 are also reported to produce cycloheximide (R. Brown, E. L. Hasen: Antibiotic Annual, 1955–1956, 246; R. Corbaz, L. Ettlinger, E. Gaumann, W. Keller-Schierlein, F. Kradolfer, L. Neipp, V. Prelong, H. Zahner: Helv. Chim. Acta., 38, 1445 (1955). It is moreover known that cyclohexamide is a useful antibiotic having a high activity toward yeasts including Cryptococcus neoformans, a pathogenic yeast which is the causal organism for a disorder known as crystococcosis (U.S. Patent 2,574,519 of Alma J. Whiffen et al. and dated November 13, 1951).

In the course of applicants' search for new antibiotics, a brownish gray sporulating Streptomyces sp., designated Streptomyces naraensis, was isolated for the first time in applicants' laboratory from a soil sample obtained at Kashiba-cho, Kitakatsuragi-gun, Nara Prefecture, Japan.

A living culture of the organism has been deposited with the American Type Culture Collection at Washington, D.C., and has been added to its permanent collection of microorganisms as ATCC 13788.

This culture produces two antifungal antibiotics, named Naramycin A and Naramycin B respectively, which have been isolated in crystalline form from the broth in which this organism was grown.

As a result of taxonomic, chemical and physiological studies on Streptomyces naraensis, this strain was considered by applicants to be a new species of Streptomycetes, and Naramycin A and Naramycin B were identified with cycloheximide and one of its stereoisomers. Characters of the Naramycins-producing strain, Streptomyces naraensis, were studied on various media. The mycelium, growing on agar substrates, is hyaline and branched. The aerial mycelium develops on most media, and gives rise to sporophores which bear cylindrical conidia in chains. The aerial mycelium is white, later turns to brownish gray, and numerous open spirals are observed. The cultural and physiological characteristics of this species are listed in Table I and II.

TABLE I

Cultural Characteristics of Streptomyces naraensis
ATCC 13788

[Morphology: Branching mycelium; numerous spirals; spores cylindrical]

| Medium (Temp., ° C.) | Growth | Aerial mycelium | Soluble pigment |
|---|---|---|---|
| Synthetic agar (17) | Colorless, thin, spreading, colonies growing into medium, later turns brownish. | Brownish gray | None. |
| Glucose-asparagine agar (27) | do | Brownish gray to gray with white patches, abundant, thick. | Do. |
| Starch agar (27) | do | Brownish gray | Do. |
| Ca malate agar (27) | White to cream colored, glossy | Very scant, white to gray | Do. |
| Tyrosine agar (27) | Sand color, glossy, restricted | Brownish gray on a few portions of the surface. | Do. |
| Plain agar (27) | Same as synthetic agar | Brownish gray | Do. |
| Nutrient agar (38) | Colorless to cream, glossy, slightly wrinkled. | None | Do. |
| Yeast extract agar (38) | Whitish to light brownish gray, thick, spreading, elevated, glossy on the surface. | Brownish gray | Do. |
| Blood agar (38) | Yellowish to dark brown, much wrinkled. | None | Do. |
| Blood serum (38) | Cream colored, glossy, mycoid-like | do | Do. |
| Egg medium (38) | Pale yellow, glossy, much wrinkled | do | Do. |
| Gelatine (38) | Poor growth on the surface, cream-colored, flaky sediment on the bottom of the liquefied portion. | do | Do. |
| Potato plug (38) | Grayish to dark brown, much wrinkled. | White to gray, thick velvety | Color of plug unchanged, black narrow zone appeared around the colony (15 days). |
| Carrot plug (38) | Dark brown, spreading, wrinkled | Whitish-gray, later turns dark brown with white patches. | Color of plug unchanged. |
| Synthetic solution (27) | Flaky sediment on the bottom of the tube, no growth on the surface. | None | None. |
| Glucose broth (38) | Colorless flaky sediment on the bottom of the tube (15 days), later surface ring, cream-colored (30 days). | Scant, white | Do. |
| Milk (38) | Poor growth on the surface, bulky sediment on the bottom of the tube. | None | Do. |

TABLE II

*Physiological Properties of* Streptomyces naraensis
ATCC 13788

| | |
|---|---|
| 1. Proteolytic action | Haemolysis: Positive.<br>Serum: Positive and strong.<br>Gelatine: Positive, 1 cm. in 30 days.<br>Milk: Rapid coagulation, followed by distinct peptonization. |
| 2. Effect on reaction | Milk: Unchanged (15 days), Alkaline (30 days).<br>Glucose-bouillon: Alkaline (30 days). |
| 3. Starch hydrolysis | Strong (35 mm. 12.5 mm.). |
| 4. Nitrite production | Positive. |
| 5. Cellulose decomposition | None (filter paper method). |
| 6. Tyrosinase production | Negative. |

The utilization of carbon sources studies by the method described by Pridham and Gottlieb V. (T. G. Pridham, D. Gottlieb, J. Bacteriol., vol. 56, page 107, 1948), is shown in Table III. This culture utilizes most of hydrocarbons tested except dulcitol, mannitol, and inulin.

TABLE III

*Utilization of Carbon Compounds*

| | | | |
|---|---|---|---|
| Xylose ++ | Rhamnose ++ | Raffinose + | Arabinose + |
| Lactose ++ | Salicin + | Mannitol − | Sucrose ++ |
| Inisitol + | Glucose ++ | Maltose + | Mannose + |
| Glycerol + | Dextrin + | Fructose ++ | Starch ++ |
| Galactose + | Sorbitol ++ | Dulcitol − | Inulin − |
| Na acetate + | Na citrate + | Na succinate + | |

NOTE.—(1) Synthetic agar except carbohydrate was used as the basal medium. (2) Observed on 10th day.

This strain does not produce any antibacterial antibiotic in the culture.

The classification of this culture was made after the keys described in Bergey's Manual of Determinative Bacteriology (R. S. Breed, E. G. D. Murray, N. R. Smith: "Bergey's Manual of Determinative Bacteriology," 7th edition, pp. 744–822 (Williams & Wilkins Co., Baltimore, 1957). From the morphological aspect this new strain belonds to the 3rd group of streptomyces (spiral formation in serial mycelium; long, open spirals) and form cultural properties to saprophytic, non-thermophilic and non-chromogenic types.

According to a Guide for the Classification of Streptomycetes published by T. G. Pridham et al. (Applied Microbiology, 6, 52–79, 1958), this new species should belong to section 3, Spira, Gray Series.

Among the Streptomyces described in the Bergey's Manual *Str. griseolus, Str. fasciculus, Str. griseus* and *Str. longisporoflavus* resemble *Str. naraensis* in some cultural properties. As reported by Leach et al. (F. E. Leach et al.: J. Am. Chem. Soc., 69, 474 (1947)), and by others, *Str. Griseus* is a representative strain which produces cycloheximide as a by-product of streptomycin. *Str. noursei* and Str. No. ETH 7796 (R. Brown-E. L. Hazen Antib. Annual, 1955–1956, 246; R. Corbaz et al.; Helv. Chim. Actal 38, 1445 (1955)), are also reported to produce cycloheximide.

On the basis of the distinctive character that the *Str. naraensis* forms open spirals on the synthetic agar, this species is distinguished from the known cycloheximide producing strains as illustrated in Table IV. From the same reason, *Str. naraensis* is also distinguished from cycloheximide non-producing strains such as *Str. griseolus, Str. fasciculus*. It is considered that morphological characteristics of sporulating hyphae are the primal guide to classify or group the Streptomycetes.

TABLE IV

*Classification of Cycloheximide Producing Strains*

| | After Bergy's Manual | After Pridham et al.'s Classification |
|---|---|---|
| *Str. naraensis* | Group 3, spiral formation in aerial mycelium, long, open spirals. | Section 3, spira, gray series. |
| *Str. griseus* | Group 1, straight, sporulating hyphae, monopodial branching, never producing regular spirals. | Section 1, rectus-flexibilis, series olive-buff. |
| *Str. noursei* | Group 3, spiral formation in aerial mycelium, long, open spirals. | Section 2, recti-naculum-apertum, series gray. |
| Str. sp. No. ETH 7796. | Group 1, straight, sporulating hyphae, monopodial branching, never producing regular spirals. | Section 1, rectus-flexibilis, series olive-buff. |

Beside this characteristic, the following differences are to be noted; *Str. griseolus* produces gray to pallid, natural gray aerial mycelium on synthetic agar and gives a thick, brown ring with abundant ash-gray aerial mycelium on the surface of glucose broth. *Str. griseus* produces a water-green serial mycelium on the conventional media. Furthermore it is not reported that *Str. griseus* produces cycloheximide as a sole antibiotic produced. Str. ETH 7796 produces greenish to yellowish pigment in synthetic and protein media. *Str. fasciculus* has a strong ability to decompose cellulose for its growth, but its ability to reduce nitrate is limited. *Str. longisporoflavus* and *Str. noursei* form typical or atypical spirals, but *Str. noursei* produces shell-pink aerial mycelium on the glucose-asparagine agar, and purple to pomegranate purple aerial mycelium on some of media.

*Str. longisporoflavus* most closely resembles *Str. naraensis* in morphological and cultural characteristics in that the former produces long open spirals with cylindrical spores and gives yellowish vegetative mycelia which produce yellow to brownish yellow aerial mycelia. But the physiological properties differ from those of *Str. naraensis* especially in its weak hydrolysis ability toward starch and slow peptonization power of milk.

As results of our studies, *Str. naraensis* is considered to be a new species of Streptomyces and it is named *Streptomyces naraensis* after the name of the locality where it was found. Further details of the taxonomic study of this species has been described by Okuda et al on Chemical and Pharmaceutical Bulletin, vol. 6, pp. 711–713, 1958.

Among the organisms whose growth is inhibited by very low concentrations of Naramycin A and Naramycin B are the following: *Saccharomyces sake, Sacch. cerevisiae, Sacch. formisensis, Torula utilis, Zygosacch, Salsus,* Hansenula Wil-7, *Candida krusei, Mycosphaerella pinodes, Piricularia oryzae,* and *Schlerotinia mali.*

The following Table V gives the results obtained.

TABLE V

*Antimicrobial Activity of Naramycin A and B by Agar Streak Dilution Method*

| Test Organism | Minimum Inhibiting Concentration (mcg./ml.) | |
|---|---|---|
| | Naramycin A | Naramycin B |
| *Saccharomyces sake* | 0.5 | 2.0 |
| *Sacch. cerevisiae* | 0.2 | 0.5 |
| *Sacch. formisensis* | 0.2 | 0.5 |
| *Torula rubra* | 1.0 | 5.0 |
| *Torula utilis* | 2.0 | 5.0 |
| *Torula candida* | 20.0 | >100.0 |
| *Zygosaccharomyces soya* | 100.0 | 100.0 |
| *Zygosacch. salsus* | 2.0 | 10.0 |
| Hansenula Wil-7 | 0.5 | 2.0 |
| *Candida albicans* | >100.0 | >100.0 |
| *Candida krusei* | 2.0 | 5.0 |
| *Trichophyton asteroides* | >100.0 | >100.0 |
| *Aspergillus niger* | >100.0 | >100.0 |
| *Aspergillus oryzae* | >100.0 | >100.0 |
| *Mucor spinescens* | >100.0 | >100.0 |
| *Penicillium chrysogenum* | >100.0 | >100.0 |
| *Penicillium citrinum* | 20.0 | 50.0 |

Test Medium: Sabouroud's Agar (27° C., 48 hrs.)

TABLE V—Continued

| Test Organism | Minimum Inhibiting Concentration (mcg./ml.) | |
|---|---|---|
| | Naramycin A | Naramycin B |
| Botrytis cinerea | 10.0 | 20.0 |
| Mycosphaerella pinodes | 1.0 | 10.0 |
| Glomerella cingulate | 5.0 | 10.0 |
| Piricularia oryzae | 2.5 | 6.0 |
| Gibberella fujikuroi | 20.0 | 20.0 |
| Ophiobolua miyabeanus | 5.0 | 10.0 |
| Gloeosporium kaki | 5.0 | 5.0 |
| Alternaris kikuchiana | 5.0 | 1.0 |
| Xanthomonas citri | >100.0 | >100.0 |
| Sclerotinia mali | 0.5 (120 hrs.) | 0.25 (120 hrs.) |
| | 2.0 (168 hrs.) | 0.5 (168 hrs.) |

Test Medium: Potato-Succrose Agar (27° C., 48 hrs.)

This invention embraces a process for growing a new and hitherto undescribed species of microorganism, *Str. naraensis*, preferably at 24–30° C. under conditions of agitation and aeration, on media consisting of carbohydrate source, such as glucose, starch; an organic nitrogen source, such as soybean powder, wheat gluten: It is characteristic that mineral salts, such as sodium chloride, potassium phosphate are not always necessary for the fermentation of Naramycins.

Inoculum may be obtained by employing a growth from Roux bottles inoculated with *Str. naraensis*. This growth is used to inoculate either shaken flasks or submerged inoculum tanks. Any shaken flask growth will generally have reached its maximum in 4 days, whereas inoculum in inoculum flasks will usually be at the most favorable period in 2 days. From the inoculum flask the broth containing the microorganism is forced into the fermenter under completely aseptic conditions, and growth is continued for a further period of 2 days.

At all times aeration is maintained in the tank by blowing sterile-air through a sparger at the rate of 0.5–1.0 volume of free air per volume of the broth per minute. If difficulty is experienced in preventing the rise of the foam within tank, anti-foaming agents, such as silicone or paraffin, or other similar agents may be added to break up the foam. While the broth is agitated at a speed depending upon the type of agitator, completely aseptic conditions are maintained and the temperature of the agitated broth is maintained between 24–30° C. After 5 to 8 days, the potency in the fermentation broth reaches the maximum.

After the growth has been completed, the mycelium is separated from the broth now containing antibiotics, Naramycin A and Naramycin B, and the mixtures of Naramycin A and Naramycin B are recovered from the broth by means of extraction with organic solvents such as n-butyl alcohol and ethyl acetate at a suitable pH, although other solvents may be employed, if desired, or by adsorbing the antibiotics from the broth onto activated carbon and eluting it from the carbon by means of organic solvents.

The solvent obtained from the above extraction or elution is removed in vacuo with introduction of water, whereby about 2 percent active substance containing aqueous solution is obtained. The aqueous solution is extracted with ethyl acetate or other suitable solvents. After removing the solvent a raw active substance containing Naramycin A and Naramycin B is obtained. Naramycin A is separated from the raw substance by recrystallization with isoamyl acetate and then purified by recrystallization with isoamyl acetate and 30 percent methanol.

Naramycin A has been shown to have an empirical formula of $C_{15}H_{23}O_4N$ and to be beta-[2-(3,5-dimethyl-2-oxo-cyclohexyl) - 2 - hydroxy-ethyl]glutarimide having the following structural formula:

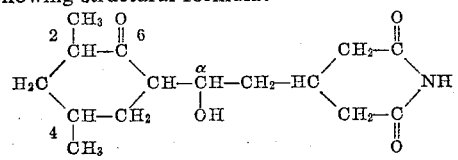

according to Kornfeld, Johes and Parke, J. Am. Chem. Soc. 1949, vol. 71, pages 150 to 159.

Its melting point is 116–116.5° C. and its optical rotation $[\alpha]_D^9 = +8°$ (c.=2, in water).

This sample showed no depression in melting point on admixture with an authentic sample of acti-dione (Upjohn Co., Ltd.) and both infra-red spectra agreed.

Naramycin B is obtained from the mother liquor from which Naramycin A has been removed. The mother liquor is concentrated in vacuo, and the residual syrup is extracted with benzene. After separating from the insoluble oily substance, the benzene solution is poured into a column of activated alumina (H-form). The column was washed with benzene containing 3 percent of methanol until the elute showed no activity. Active fractions were collected and concentrated in vacuo to syrup, to which large quantities of ether was added and kept in the refrigerator overnight. From the ether solution crude Naramycin B (450 γ/mg.) crystallized out. Crude Naramycin B is purified by crystallization from appropriate solvents such as water and ethyl acetate. Naramycin B has been shown to have an empirical formula of $C_{15}H_{23}O_4N$. Its melting point is 109–110° C. and its optical rotation $[\alpha]_D^9 = +48.8°$ (c.=1, in water).

A suspension obtained by mulling crystaline Naramycin B in mineral oil shows many characteristic absorption bands in the infrared. Among these are the following frequencies (in reciprocal centimeters): 3161, 3033, 2867, 2825, 1706, 1458–1449, 1412, 1374, 1289–1285, 1270, 1235, 1193 (broad), 1159, 1142, 1094, 1078, 1068, 1032, 1015, 1003, 979, 929–926, 903, 868–857, 823 and shoulders at 3261, 1723, 1688, 1361, 1124, 1104. The infrared absorption spectrum of this mineral oil mull is shown in the accompanying drawing.

After the chemical and physicochemical examinations of Naramycin B, this new antibiotic is found to be one of the stereoisomers of cycloheximide. According to Cahn's new convention (R. S. Cahn, C. K. Ingold, V. Prelog; Experientia, vol. 12, page 81, 1956), the absolute configuration of Naramycin B belongs to (2S:4S:6R:αS)-series, while Naramycin A (cycloheximide) and isocycloheximide (J. H. Ford, U.S. 2,903,457, and A. J. Lemin, U.S. 2,903,458), belong to (4S:6S:αS)-series and (2R:4S:6R:αS)-series respectively. Further details of conformational studies of these antibiotics were discussed by the present applicants on Chemical and Pharmaceutical Bulletin; vol. 7, pages 659–665 and pages 671–679, 1959; and ibid., vol. 8, pages 335–340, 1960.

It is to be understood that for the production of Naramycin A and Naramycin B we do not wish to limit ourselves to this particular organism or to organisms fully answering the above description which is given merely for illustrative purposes. We especially wish to include the use of organisms which are mutants produced from the described organisms by mutating agents such as X-radiation, ultra violet radiation, nitrogen mustard, etc.

The following examples are given only to illustrate the practice of the present invention and are not to be construed as limiting the same.

EXAMPLE I

FORMATION, RECOVERY AND PURIFICATION OF NARAMYCIN A AND B

Medium:

| | Grams |
|---|---|
| Glucose | 6000 |
| Starch powder | 4500 |
| Soybean powder | 5250 |
| Sodium chloride | 450 |
| Light cake made of wheat-gluten | 600 |

Distilled water was added to 150 liters. pH was adjusted to 7.0 with sodium hydroxide.

150 liters of the above medium were added to a 400 liter tank made of iron. To this tank were added 250 ml. of silicone and liquid paraffin (1:5) as an anti-forming agent. The medium was then sterilized at 120° C. for 30 minutes. Upon cooling, this tank was inoculated with 1.5 l. of a seed-culture of *Streptomyces naraensis* and was incubated at a temperature of 27° C. for 120 hours.

At all times aeration was maintained in the tank by blowing in sterile air through a sparger at the rate of 1 volume of free air per volume of broth per minute. A fermentation medium having a potency of 1500 $\gamma$/ml. was obtained. The medium was adjusted to pH 2.0 with hydrochloric acid. To this were added 4500 gms. of kieselguhr and, after heating for 30 minutes at a temperature from 60 to 70° C., the mycelium was filtered off by a filter-press.

45 liters of the filtrate were adjusted to pH 5.5 with 30 percent sodium hydroxide solution and there was added 590 gms. of activated carbon. After stirring for thirty minutes, the medium was filtered off. The carbon was eluted with 27 liters of hydrochloric acid and methanol (pH 2.0). 90 percent of the active substance was recovered by this procedure.

The methanol was removed in vacuo with introduction of water and about 3 liters of 2 percent aqueous solution of active substance were obtained. The potency was 20.200 $\gamma$/ml.

ISOLATION OF NARAMYCIN A 3 liters of the above aqueous solution were extracted with 7.5 liters of ethyl acetate. The ethyl acetate was removed by distillation in vacuo and 98 gms. of our raw antibiotics were obtained. Its potency was 600 $\gamma$/mg. The raw substance was dissolved in 100 mls. of isoamyl acetate with heating on a water-bath. When the isoamyl acetate solution was cooled crystals precipitated out. The crystals were filtered off and washed with a small quantity of isoamyl acetate and petroleum ether and dried. 38 gms. of raw Naramycin A (cycloheximide) were obtained. Its potency was 880 $\gamma$/mg.

By recrystallizing the raw crystals from isoamyl acetate and 30 percent methanol pure white crystals of Naramycin A were obtained. M.P. 115–116° C.

ISOLATION OF NARAMYCIN B

The isoamyl acetate mother liquor (200 mls., 188,000 $\gamma$/ml.) separated from the crystals of Naramycin A was removed by distillation in vacuo. The syrup-like substance remaining was dissolved in benzene. The benzene solution was poured into a column of active alumina (H-form). The column was washed with benzene containing 3 percent methanol until the elute showed no activity. Most of the colored impurities were absorbed in the column of alumina and the active substance was eluted.

The solution eluted was concentrated in vacuo to syrup, to which large quantities of ethyl ether were added and the concentrate kept in a refrigerator overnight. From the ether solution crude Naramycin B crystallized out. The yield was 50 gms. M.P. 80–85° C. By repeating recrystallizations of the crude Naramycin B from water, pure Naramycin B was obtained, M.P. 109–110° C.

EXAMPLE II 45 liters of a fermentation medium prepared as in Example I, after fermentation with *Str. naraensis*, were extracted with 30 liters of n-butanol. About 95 percent of the active substance was extracted. The n-butanol was removed in vacuo with introduction of water and about 3 liters of 2 percent aqueous solution of active substance were obtained. The potency was 20.500 $\gamma$/ml.

From this solution Naramycin A and B were prepared in the same manner as in Example I.

EXAMPLE III 45 liters of a fermentation medium (1500 $\gamma$/ml.) prepared as in Example I, after fermentation with *Str. naraensis*, were extracted with 30 liters of ethyl acetate. About 95 percent of the active substance was extracted. The ethyl acetate was removed in vacuo with introduction of water and about 3 liters of 2 percent aqueous solution of active substance were obtained. The potency was 20.500 $\gamma$/ml. From this solution Naramycin A and Naramycin B were prepared in the same manner as in Example I.

Modifications may be made in carrying out the present invention without departing from the spirit and scope thereof. For instance, the cycloheximide and its isomer may be recovered by adsorption onto activated carbon; or they may be recovered by extracting with a water-immiscible solvent, such as alkyl acetates wherein the alkyl radical has 2 to 5 carbon atoms, mono-alcohols having 3 to 5 carbon atoms, and chlorinated hydrocarbons having 1–5 carbon atoms. The cycloheximide may be separated from its isomer by fractional crstallization from a suitable selective solvent.

These and other variations may be made in the details of operation.

What is claimed is:

1. A process for producing cycloheximide and its isomer simultaneously which comprises cultivating a strain of *Streptomyces naraensis* in an aqueous nutrient medium under aerobic conditions for a sufficient length of time to impart antimicrobial activity to said medium, and recovering a mixture of said cycloheximide (Naramycin A) and its isomer (Naramycin B) from said medium.

2. A process according to claim 1 in which said medium contains at least carbohydrates, nitrogen compounds.

3. A process according to claim 1 in which the cultivating is at temperatures of about 24° to 30° C.

4. A process according to claim 1 in which the cultivating is at temperatures of about 24° to 30° C., for a period of about 4 to 10 days.

5. A process according to claim 1 in which the product is extracted with a water immiscible organic solvent selected from the group consisting of alcohols, lower aliphatic ketones, acetates, and chlorinated hydrocarbons, said solvent removed to give raw antibiotics, the latter dissolved in amyl acetate with heat, the solution cooled, whereby cycloheximide crystallizes from said solution.

6. A process according to claim 1 in which the product is treated to isolate the cycloheximide in crystalline form, the mother liquor being dissolved in benzene, said solution is concentrated, ether is added to said concentrate, whereby said isomer (Naramycin B) is allowed to crystallize.

7. A process as claimed in claim 1, wherein the recovery of the Naramycin A and Naramycin B includes the step of adsorption onto activated carbon.

8. A process as claimed in claim 1, wherein the recovery of the Naramycin A and Naramycin B includes the step of extracting the antibiotic into a water immiscible organic solvent selected from the group consisting of alcohols, lower aliphatic ketones, acetates, and chlorinated hydrocarbons.

9. A process as claimed in claim 5, wherein the recovery of the Naramycin A and Naramycin B includes the step of extracting the antibiotic into a member selected from the class consisting of n-butanol, ethyl acetate, methyl isobutyl ketone, chloroform and methylenedichloride.

10. A process as claimed in claim 5, wherein the recovery of the Naramycin A and B includes the step of separating Naramycin A from Naramycin B by recrystallization.

11. A process as claimed in claim 5, wherein the recovery of the Naramycin A and Naramycin B includes the step of separating Naramycin A from Naramycin B by recrystallization with isoamyl acetate.

12. A process according to claim 1 in which said mixture is then treated to separate said cycloheximide and its isomer from each other by fractional crystallization from a selective solvent for one of said cycloheximide and said isomer.

References Cited in the file of this patent
UNITED STATES PATENTS

| | | |
|---|---|---|
| 2,574,519 | Whiffen et al. | Nov. 13, 1951 |
| 2,612,502 | Leach | Sept. 30, 1952 |
| 2,848,365 | Jackson | Aug. 19, 1958 |
| 2,885,326 | Churchill | May 5, 1959 |